United States Patent

Dupuis

[15] 3,656,220

[45] Apr. 18, 1972

[54] INDEXABLE BROACH
[72] Inventor: Hubert J. Dupuis, Warren, Mich.
[73] Assignee: Carmet Company, Pittsburgh, Pa.
[22] Filed: Jan. 2, 1970
[21] Appl. No.: 176

[52] U.S. Cl. .................................29/95.1, 29/96, 29/105
[51] Int. Cl. .....................B26d 1/04, B26d 1/12, B26d 1/00
[58] Field of Search..........................29/95.1, 96, 105, 105 A

[56] References Cited

UNITED STATES PATENTS

| | | | |
|---|---|---|---|
| 2,831,241 | 4/1958 | Bader et al. | 29/95.1 |
| 2,998,634 | 9/1961 | Raehrs et al. | 29/95.1 |
| 3,200,474 | 8/1965 | Kralowetz | 29/105 |
| 3,405,433 | 10/1968 | Williams | 29/105 A |

Primary Examiner—Harrison L. Hinson
Attorney—Richard A. Speer, Vincent G. Gioia and Howard R. Berkenstock, Jr.

[57] ABSTRACT

Apparatus for broaching planar or contoured surfaces with a broaching tool having a plurality of preferably indexable and reversible cutting inserts supported by individual tool holders superimposed on a broaching block in a substantially exposed relationship to the broaching block. In preferred embodiments the broaching block contains gauging means adapted to engage a cooperating portion of the tool holder whereby the holder may be rapidly positioned and forces of broaching may be transferred from the tool holder supporting the cutting inserts to the broaching blocks. A further embodiment includes the broaching block and tool holder adapted with a keyway to engage a complementarily shaped projection to enhance the rapid positioning of the mounting block and increase the locating force upon the insert which secures it in position.

9 Claims, 8 Drawing Figures

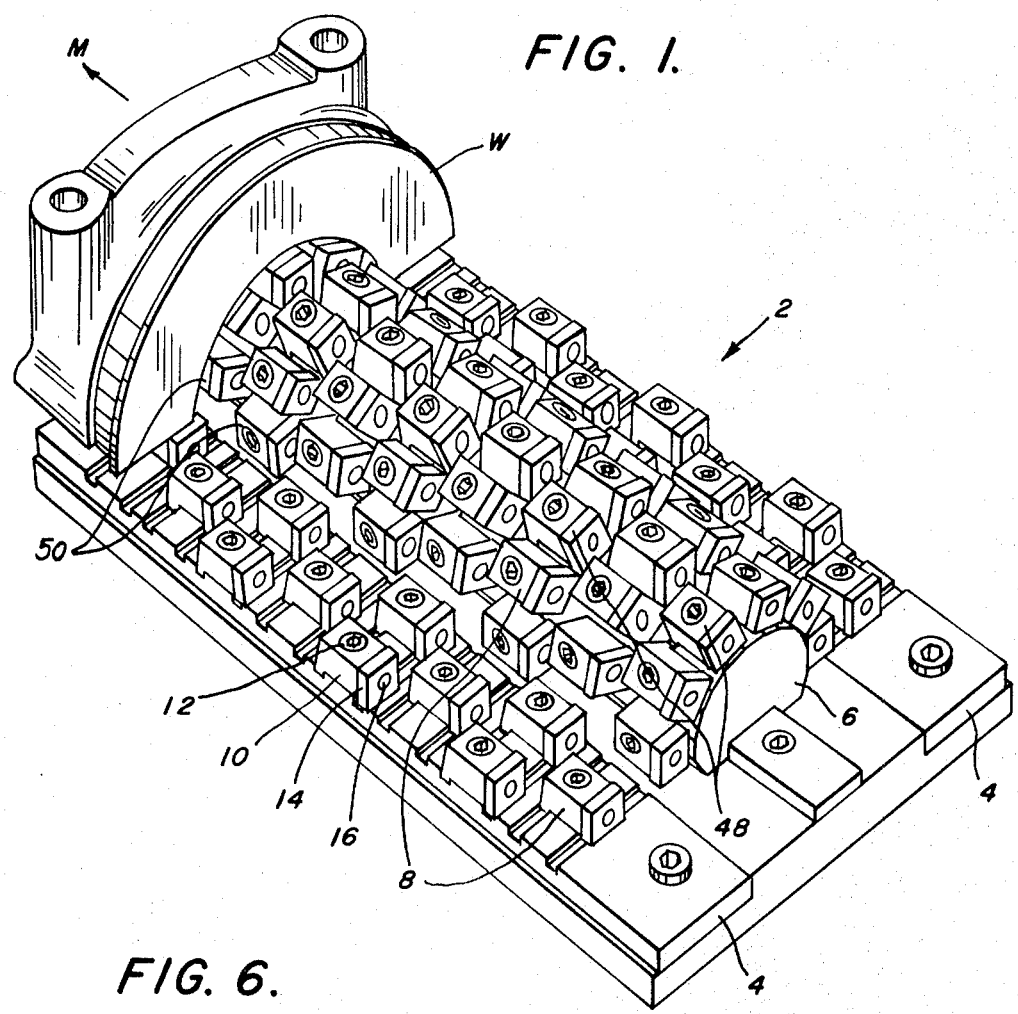
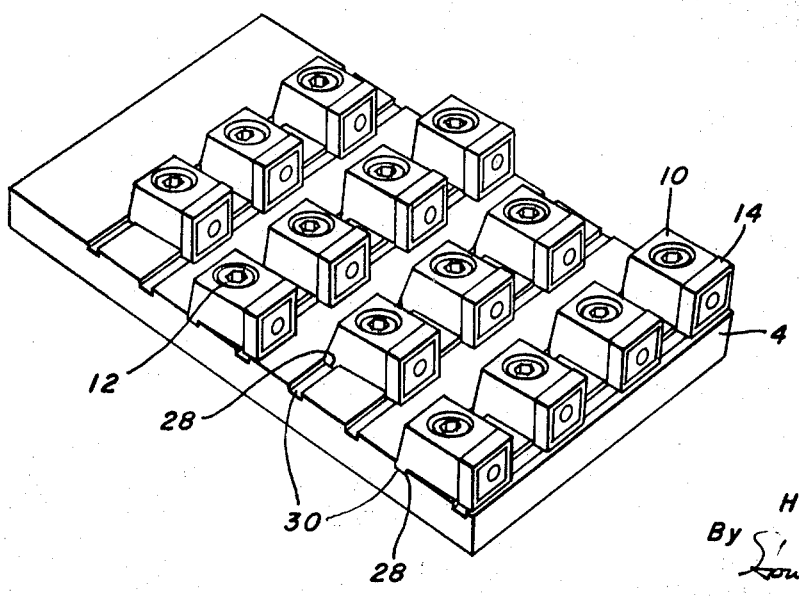

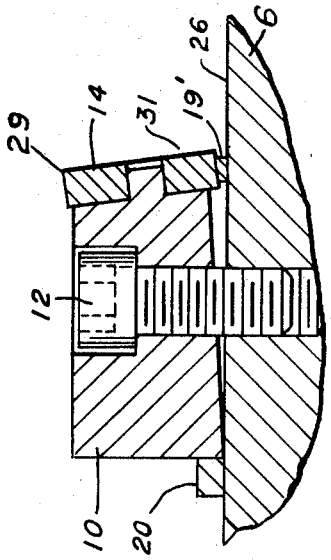
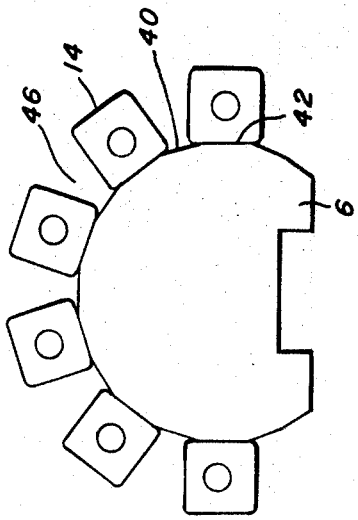
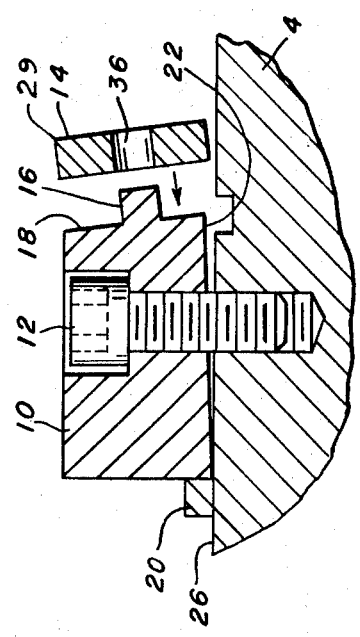
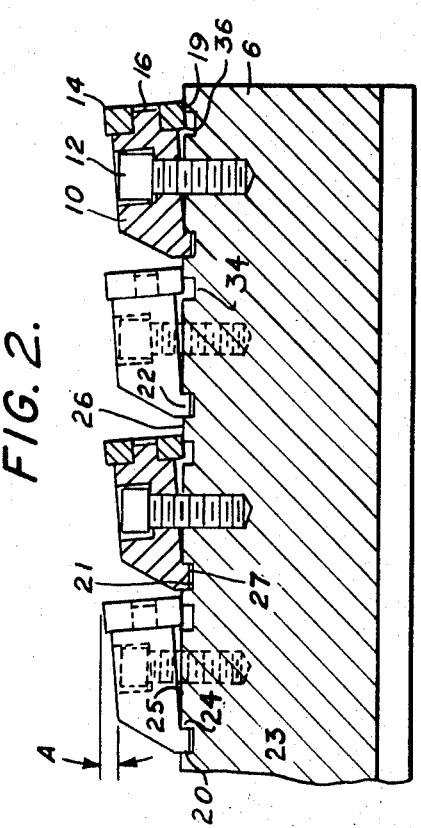

INVENTOR.
HUBERT J. DUPUIS
By
Attorney

INDEXABLE BROACH

BACKGROUND OF THE INVENTION

In broaching apparatus such as is suitable for the precision planing of a metal surface the use of indexable "throw-away" cutting inserts is known. Existing applications of these disposable cutting inserts utilize a high hardness material, such as some steels or tungsten carbide and are usually made in regular shapes; i.e., squares or triangles and are of uniform thickness. These regular shaped inserts provide a plurality of cutting edges, (eight in the case of a reversible square and six in the case of a reversible triangular insert), and may be discarded and replaced with a new insert when all of the edges have been worn. Conventional indexable inserts are supported in broaching tools of two general types. In the first type of mounting, the insert is held in a separate, individual holder, known in the industry as a "spike," with the indexable insert held in a recess or pocket in the shank of the "spike" by a clamp which is usually mounted on the face of the shank and bearing on the insert. These "spikes" are then located in a broaching assembly for attachment to a broaching machine in individual pockets, each "spike" being firmly held in place with means such as a wedge. In the second type of mounting of indexable inserts for broaching, the insert is mounted in a slot which may be provided with a locating slot and a vertical gauge according to the dimensions of the insert to provide an operable cutting edge located at the predetermined desirable level. The cutting insert may also be gauged by screw means operable with the cutting insert holder. The insert slot conventionally communicates with a larger wedge slot either before or after the insert in relation to the direction of the broaching operation. The insert is mounted in the insert slot and either preceded or backed up by a wedge located in the wedge slot. Usually, locating means, such as pins or the like, are set in the insert slot between which the inserts may be placed. When the indexable insert is so mounted in a slot and backed up by a wedge, relatively little of the insert protrudes from the broaching assembly and in conventional mountings in the insert's operable cutting edge protrudes from the mounting in a relatively unsupported manner. In the known types of insert mountings, relatively little of the insert and its support structure are exposed and in addition, there are gaps, or pockets in the broaching tools surrounding the insert locations which often become packed with chips and dirt, interfering with the rapid replacement of the insert in event of failure. The exposure of the cutting insert in an unsupported manner allows failure of the insert which may further result in damage to the supporting members, such as the wedges or the broaching block. The small pockets immediately surrounding the inserts and wedges permit the collection of foreign material adding to the difficulty in removal of the insert and relocation of a new insert when replacement is necessary.

It will be appreciated from the following detailed description of my invention and the examination of the drawings attached hereto, that an exposed arrangement of mounting an indexable cutting insert is described which provides greater access to the cutting tool and increased support for the cutting edge of the insert, as well as providing a broaching member which is more readily serviced.

SUMMARY OF THE INVENTION

Apparatus for broaching utilizing a cutting tool which is positioned on a tool holder, which in turn, is superimposed on a broaching block. The cutting tool is preferably a reversible, indexable insert. The apparatus further includes gauging means to orient the tool holder on the broaching block and detachable means to secure the tool holder against the broaching block to transmit the forces generated during broaching to the block. In the preferred embodiment the securing means also locks the cutting insert on the tool holder. Preferred embodiments of the invention include a plurality of cutting inserts disposed on holders wherein the cutting edges are co-planar to provide a flat, machined surface as well as embodiments wherein the tool holders and inserts are mounted on polyhedral broaching blocks to machine a surface of a generally concave cross-section.

DESCRIPTION OF THE DRAWINGS

FIG. 1 is a pictorial view of the broaching assembly of my invention.

FIG. 2 is a side elevation of the assembly of FIG. 1.

FIG. 3 is an elevation of an alternative embodiment of the tool holder of FIG. 2.

FIG. 4 is an elevation of a second alternative embodiment of the tool holder of FIG. 2.

FIG. 5 is an end view of the broaching tool of FIG. 2.

FIG. 6 is a pictorial view of a broaching tool of my invention for planar broaching.

DETAILED DESCRIPTION OF THE PREFERRED EMBODIMENTS

Figure 5A:
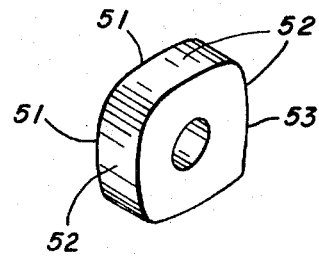
FIG. 5a is a view of an alternative cutting tool for the tool of FIG. 5.

Referring now to the drawings and FIG. 1 in particular, reference numeral 2 indicates a broaching assembly adapted to be mounted on a broaching machine (not shown) by means well know. The portion of the machine to which a broaching assembly 2 is connected, may be either the stationary portion, or the movable portion, such as the ram, of the broaching machine. A workpiece W would be connected to the alternate member of the broaching machine such that a cutting stroke may be established (indicated by relative movement M) between the broaching assembly 2 and the workpiece W. In conventional broaching, the cutting stroke would be followed by return stroke. The broaching assembly 2 described herein, includes both a planar broaching block 4 and a convex polyhedral broaching block 6. It will be recognized by those familiar with the art that the singular types of broaching blocks may be utilized separately to broach a single surface as that illustrated in FIG. 6, rather than the irregular shape of the example of FIG. 1 requiring a multiple surface broach. Broaching blocks 4 and 6 have mounted thereon broaching tools 8, including tool holder 10 secured to blocks 4 and 6 by detachable means such as cap screw 12. Broaching tools 8 further include cutting tools 14, such as reversible and indexable inserts, which may be positioned and secured upon mounting block 10 by means such as locating post 16.

Referring now to FIGS. 2, 3 and 4, it will be noted that tool holder 10 is superimposed on top of, as opposed to being contained within, broaching blocks 4 or 6, a departure from conventional practice. Likewise, it should be noted that cutting insert 14 is positioned in an exposed relation on broaching blocks 4 and 6 being located at the forward end of tool holder 10 on a support surface 18. Screw means 12 secures holder 10 on blocks 4 and 6 and also insert 14 in position on post 16 by causing the insert to bear upon gauging means 19 to be subsequently described. Broaching blocks 4 and 6 are adapted with indexing means 20 to facilitate positioning of tool holder 10 on the broaching blocks. In the preferred embodiment illustrated in FIG. 2, indexing means 20 includes a recess 21, such as a rectangular keyway, running transversely across the broaching blocks (further illustrated in FIGS. 1 and 6). The preferred embodiment further includes the tool holder 10 being adapted with a cooperating portion 22, such as a rectangularly-shaped bead adapted to be closely received within recess 21. It will be appreciated by those familiar with the art that if bead 22 is adapted to be closely received within recess 21 in such as a tongue and groove joint, for example, additional advantage may be gained in the indexing of tool holder 10 upon the broaching blocks 4 and 6. Positive indexing of the tool holder 10 in position is assured in both directions (with and against relative movement "M" of the broaching operation) because of the positive keying of the bead 22 to the blocks 4 and 6. It should be further noted that the tongue and groove arrangement assures alignment of the tool holder 10 parallel with the relative movement "M" of the broaching operation. This, in conjunction with the further support provided by cap screw 12, provides more effective resistance to twisting of the tool holder under adverse loading thereby providing a more uniform support of the tool holder and thus, the cutting insert 14, resting upon the insert support surface 18. Those familiar with the art will appreciate that the enhancing of the uniform support of the cutting insert 14 allows a more even wear of the cutting edge and less likelihood of deterioration or break-up of the cutting insert under additional adverse loading as during the broaching operation. Further reference to FIG. 2 reveals that the preferred arrangement of bead 22 is that its vertical dimension is advantageously less than the overall depth of recess 21, such that tool holder 10 contact broaching blocks at 24 with the base 25 of tool holder 10 and meets surface 26 of the base of block 6. The preferred embodiment thus insures a gauging function at 24, as well as providing a void space 27 to minimize the interference of dust and dirt with the location and indexing of tool holder 10 on block 6.

FIGS. 3 and 4 illustrate alternative arrangements of indexing the tool holder 10 to blocks 4 or 6. Indexing means illustrated here may include a projection at 20 on the surface 26 of blocks 4 or 6, providing a surface against which tool holder 10 may be positioned by the cooperating portion of holder 10 which engages the projection at 20. Similarly with this embodiment as described with the embodiment in the previous paragraph, it will be appreciated that the tool holder 10 and cutting insert 14 are supported in a substantially exposed relation to surface 26 of blocks 4 and 6, while also providing a rigid mounting of tool holder 10 upon the blocks. As previously described, such an arrangement provides for a uniform transfer of the forces of broaching generated during cutting at the insert cutting edge 29 to the broaching blocks 4 and 6; further promoting longer life of the cutting insert 14 as well as minimization of deterioration or break-up of the insert under adverse loading.

As illustrated in FIGS. 2 through 4, cutting insert 14 is mounted on tool holder 10 with a negative rake. Those familiar with the art will recognize that minor alteration in the tool holder will permit mounting of the insert 14 with a positive rake for those situations where such rake is more advantageous. Further reference to these figures illustrates the clearance "A" which is obtained in the invention as occurring behind the cutting insert 14 and a workpiece, while providing a more fully supported insert 14 on tool holder 10 than is previously known in the art. This clearance is obtained by gauging the cutting insert 14 on blocks 4 or 6 in a manner which elevates the forward portion of the tool holder 10 as at 31. In the preferred embodiment illustrated in FIG. 2, insert 14 is gauged directly against block 6 as at 19. Tool holder 10 is adapted such that the distance between locating means 16 and a top surface 26 of block 6 when the tool holder 10 is in position, is less than the dimension of the cutting insert 14 extending below the post 16. Such an arrangement causes the tool holder 10 to be secured to block 6 in a tilted position, generating the clearance in the block behind cutting insert 14 as indicated at "A." The preferred embodiment also includes a gauging recess 34 located transversely on block 6, generally beneath the cutting insert 14 at the inactive cutting edge 36. This gauging recess 34 is cut into broaching block 6 such that the inactive cutting edge 36 does not contact any portion of the block 6 and in fact, protects edge 36 from damage while in this position. In the preferred embodiment when securing means (cap screw 12) is tightened, the cutting insert 14 bears on the gauging means 19, forcing the insert 14 against post 16 and further, tool holder 10 is drawn downwardly onto block surface 26 at 24 securing the tool holder 10 in position against the forces of broaching. It will be recognized by those familiar with the art that nominal loosening of the cap screw 12 frees insert 14 from its secured position, enabling easy removal and indexing or reversing on post 16 to bring a new cutting edge 29 into position. It is to be emphasized that with my invention it is unnecessary to completely remove the cap screw 12 or tool holder 10 from the broaching blocks 4 or 6 in order to index or reverse cutting insert 14. In the event of damage to the tool holder from deterioration of the cutting insert, the tool holder may be removed and replaced rapidly by the mere removal and replacement of a single fastener (cap screw 12). The exposed relation of tool holder 10 and insert 14 permits greater free area around the tool holder and insert, permitting a more rapid interchange and maintainence of the broaching tool 8. Those familiar with the art will appreciate the advantage in total savings of down time from the broaching apparatus which may be accomplished in a relatively small amount of time saved in the servicing of an individual tool holder or insert due to the great number of broaching tools 8 required for large broaching operations.

An alternative gauging means 19 is illustrated in FIG. 4 wherein a projection is provided on the surface 26 of block 6. In this embodiment the side of insert 14 may rest on the projection at 19, providing gauging of cutting edge 29 and insuring that the inactive cutting edge 36 is free of block surface 26.

In the embodiment illustrated in FIG. 1 and further illustrated in FIG. 6, for broaching irregular surfaces such as a concave surface, it should be understood that a plurality of cutting inserts 14 and tool holders 10 are affixed to a polyhedral block surface 40 such that each cutting insert 14 and tool holder 10 are located on a flat surface 42, thereby providing a greater stability for the broaching tool 8. It should be appreciated by those familiar with the art that any of the variety of embodiments of the tool holder and the cutting inserts illustrated in FIGS. 2 through 4, may be adapted to such a polyhedral block 6. In the example, the broaching tools 8 are mounted on alternate flat surfaces 42 of the polyhedral surface 40, thus, leaving spaces as at 46 therebetween. Reference to FIG. 1 illustrates that the inserts are oriented in rows 48 such that alternate rows of holders 10 are mounted on alternate flats (those unoccupied in the previous rows). Such an arrangement provides a continuously planed surface at regular intervals in the broaching operation, minimizing and providing a more uniform chip loading. It is illustrated in FIG. 1 that the machine surface of workpiece "W" is generated generally round but slightly polygonal with rectangular cutting inserts 14. In order to provide a machine concave work surface with a smooth, (round) finish, the final two rows of holders 10, as at 50 may be provided with inserts having a cross-section as shown at FIG. 5a, with cutting edges 51 of a radius corresponding to that of the workpiece "W" surface on two sides 52. It will be recognized that such insert will provide four cutting edges, rather than the eight of the rectangular configuration, however, providing a smooth, machined, curved surface while two sides 53 are maintained flat for gauging of the insert. The advantage of minimizing the required number of cutting inserts having a radius will be appreciated by those familiar with the art in that cost of manufacture of radii is substantially higher than that for the uniform rectangle or square insert.

Figure 7:
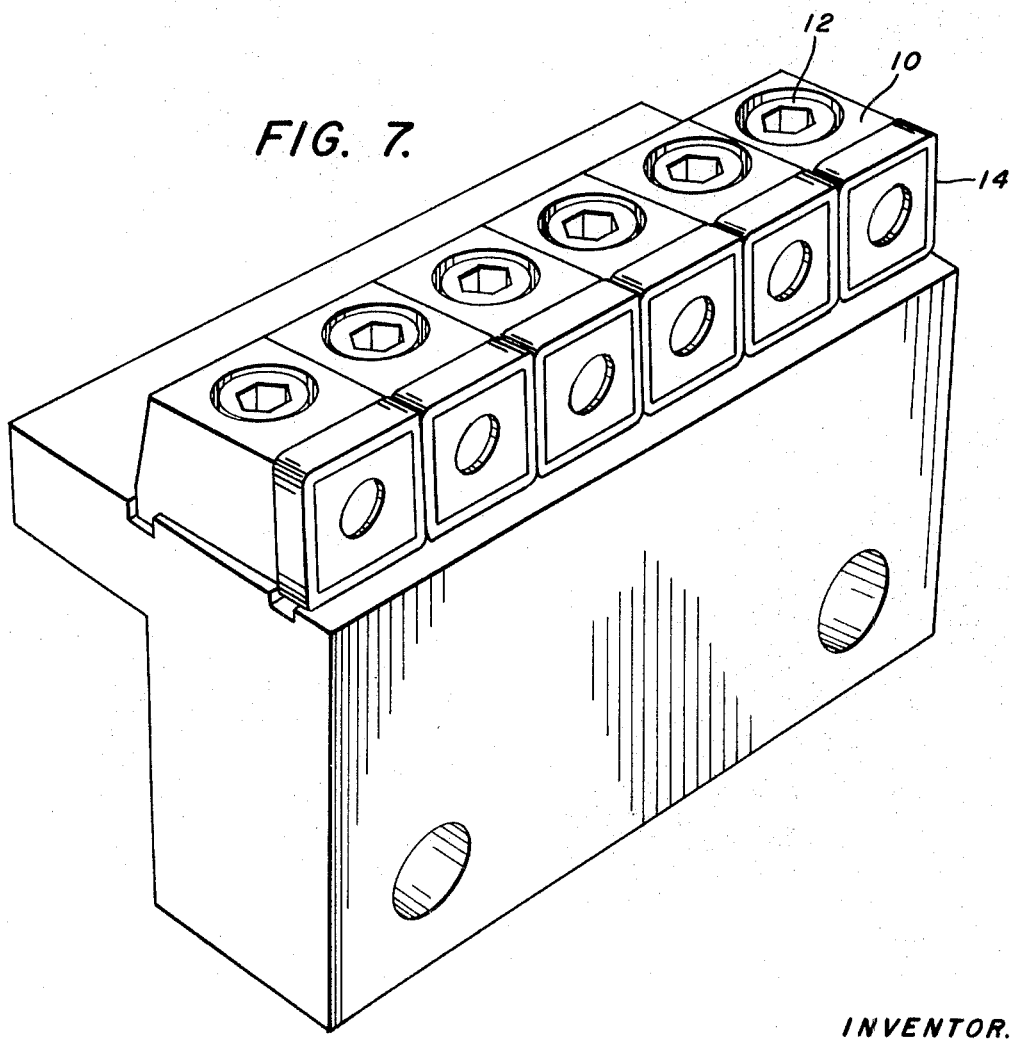
FIG. 7 is a pictorial view of an alternating embodiment of my invention.

A broaching assembly for machining a flat surface is illustrated in FIG. 1 mounted on broaching block 4 and is also singularly illustrated in FIG. 6. The staggered arrangement of broaching tools 8 is demonstrated in this figure as well. An alternate of the arrangement of cutting tools wherein it is necessary or desirable to cut a substantially planar surface with a single row of broaching tools 8, is illustrated in FIG. 7. Reference there will illustrate the side by side positioning of tool holder 10 and cutting inserts 14. Such an arrangement is often advantageous to provide a "bumper broach" to remove irregularities in the workpiece surface prior to the finer machining with the broaches illustrated in FIGS. 1 through 6.

In the preferred embodiments illustrated in FIGS. 1 through 6, the subsequent rows 48 of broaching tools 8 are elevated slightly relative to the preceding row, to accomplish additional cutting of the workpiece "W" by each tool. Those familiar with the art will appreciate that the greater number of tools per total cut made reduces the cutting load for a particular tool and enables a deeper cut per stroke to be made. I achieve the increasing elevation by increasing the cross-section of the broaching blocks 4 and 6 in the direction of relative motion "M."

It will be understood by those skilled in the art that various modifications and adaptations to the invention herein disclosed may be made without materially departing from the scope of the appended claims.

I claim:

1. Apparatus for broaching comprising a broaching block, a reversible and indexable cutting tool having a bore extending therethrough and having sides disposed between reversible cutting edges for each index position, a tool holder for said cutting tool superimposed on the outer surface of said broaching block and projecting therefrom, a locating post projecting from said tool holder at an angle to said surface and through said bore in the cutting tool for positioning the tool on said holder at an inclination to said surface, and means detachably securing said tool holder to the broaching block, the broaching block being provided with a transverse shoulder forming gauging means engaging the end of the tool holder opposite said post to position the holder on the block, and the broaching block also being provided with a transverse gauging recess having a wall with an edge engaging the cutting tool along a side between inactive cutting edges adjacent the broaching block to protect those edges.

2. A broaching tool according to claim 1 wherein said bore in the cutting tool is centrally located in said cutting tool, such that the cutting tool cutting edges are symmetrically located about said locating post, whereby rotation of said cutting tool about said locating post will index a subsequent cutting edge into a predetermined cutting position.

3. A broaching tool according to claim 2 wherein said means to detachably secure said tool holder to said broaching block is disposed intermediate said tool holder gauging means and said cutting tool gauging means, whereby said cutting tool cooperates with said gauging means and securing means to rigidly support said tool in said tool holder on said broaching block.

4. A broaching tool according to claim 3 wherein the top surface of said broaching block is planar and adapted to have a plurality of tool holders and cutting tools in a transverse row thereon, whereby a pass of the broaching tool affects a removal of material from a workpiece over a width substantially larger than the width of a single cutting edge of said cutting tools.

5. A broaching tool according to claim 4 wherein said broaching block is adapted to contain a plurality of tool holders and cutting tools thereon in a plurality of transverse rows, the tool holders of each row having a space therebetween no larger than the width of a cutting edge and that the tool holders and cutting tools of successive rows are affixed to said broaching block substantially in line with the spaces of the preceding row.

6. A broaching tool according to claim 2 wherein said broaching block is a section of a polyhedron and is adapted to have a plurality of mounting blocks and cutting tools in a transverse planar row on the faces of said polyhedron whereby a pass of the broaching tool affects a removal of material from a workpiece over a width substantially larger than the width of a single cutting edge, which removal of material is concave in cross-section.

7. A broaching tool according to claim 6 wherein the broaching block is adapted to contain a plurality of tool holders and cutting tools in a plurality of transverse planar rows, the tool holders of each row having a space therebetween no larger than the width of the cutting edge of said cutting tool and that the tool holders and cutting tools of successive rows are affixed to said broaching block, substantially in line with the spaces of the preceding row.

8. A broaching tool according to claim 7 wherein the cross-section of said polyhedral section increases in the direction of successive rows of tool holders, such that successive rows of said cutting tools are positioned to remove additional broached material from a workpiece with respect to said first row of cutting tools.

9. A broaching tool according to claim 4 wherein the top surface of said broaching block is adapted to have a plurality of mounting blocks and cutting tools in a single transverse row, the adjacent cutting tools abutting so as to form a single cutting edge whereby a pass of the broaching block and cutting edges of the tools affects a single removal of material over a width substantially larger than the width of a single cutting edge.

* * * * *